April 17, 1928.
L. S. MILLER
1,666,395
APPARATUS FOR SHARPENING HANDSAWS
Filed Oct. 21, 1925
3 Sheets-Sheet 2
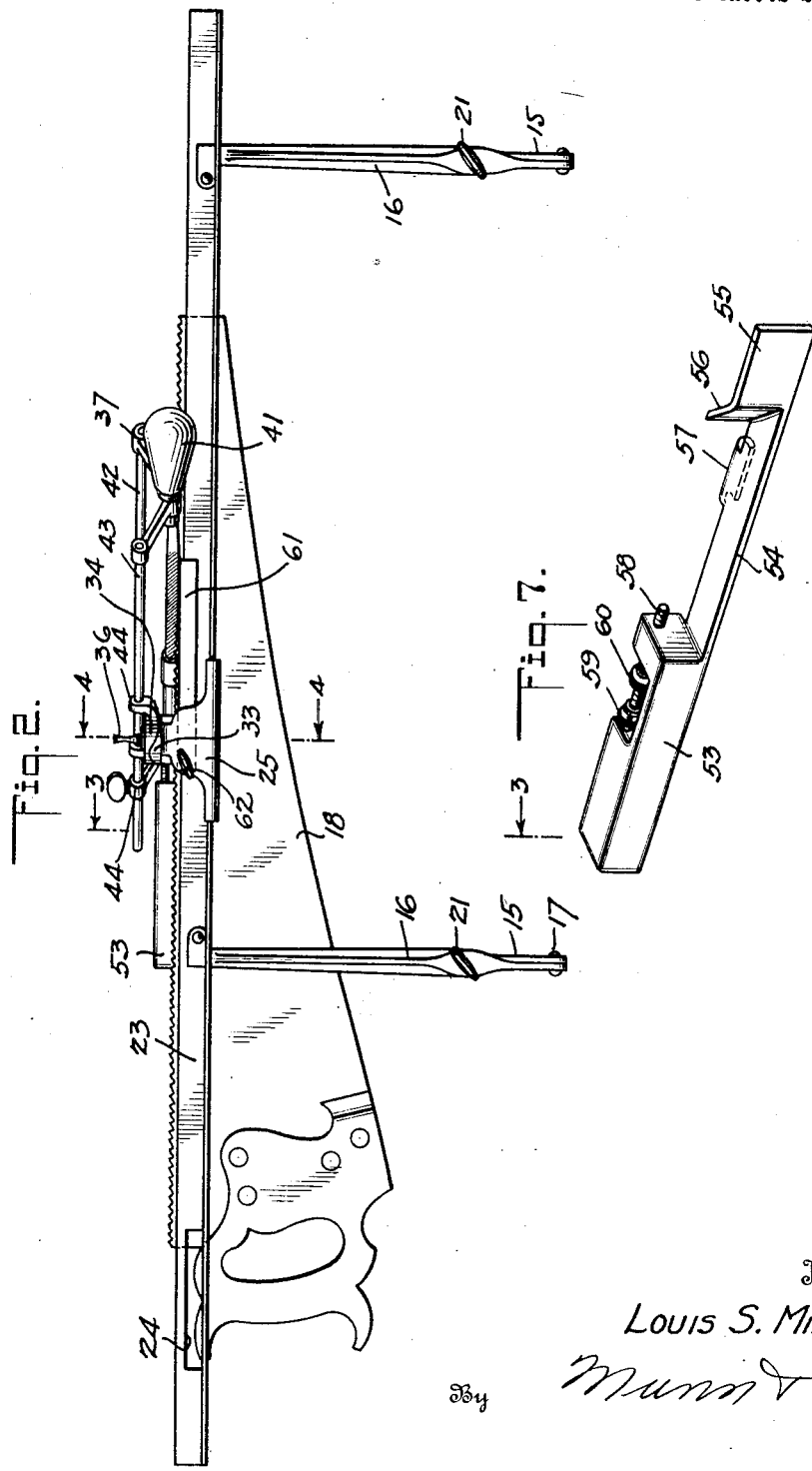
Inventor
LOUIS S. MILLER
By Munn & Co.
Attorney

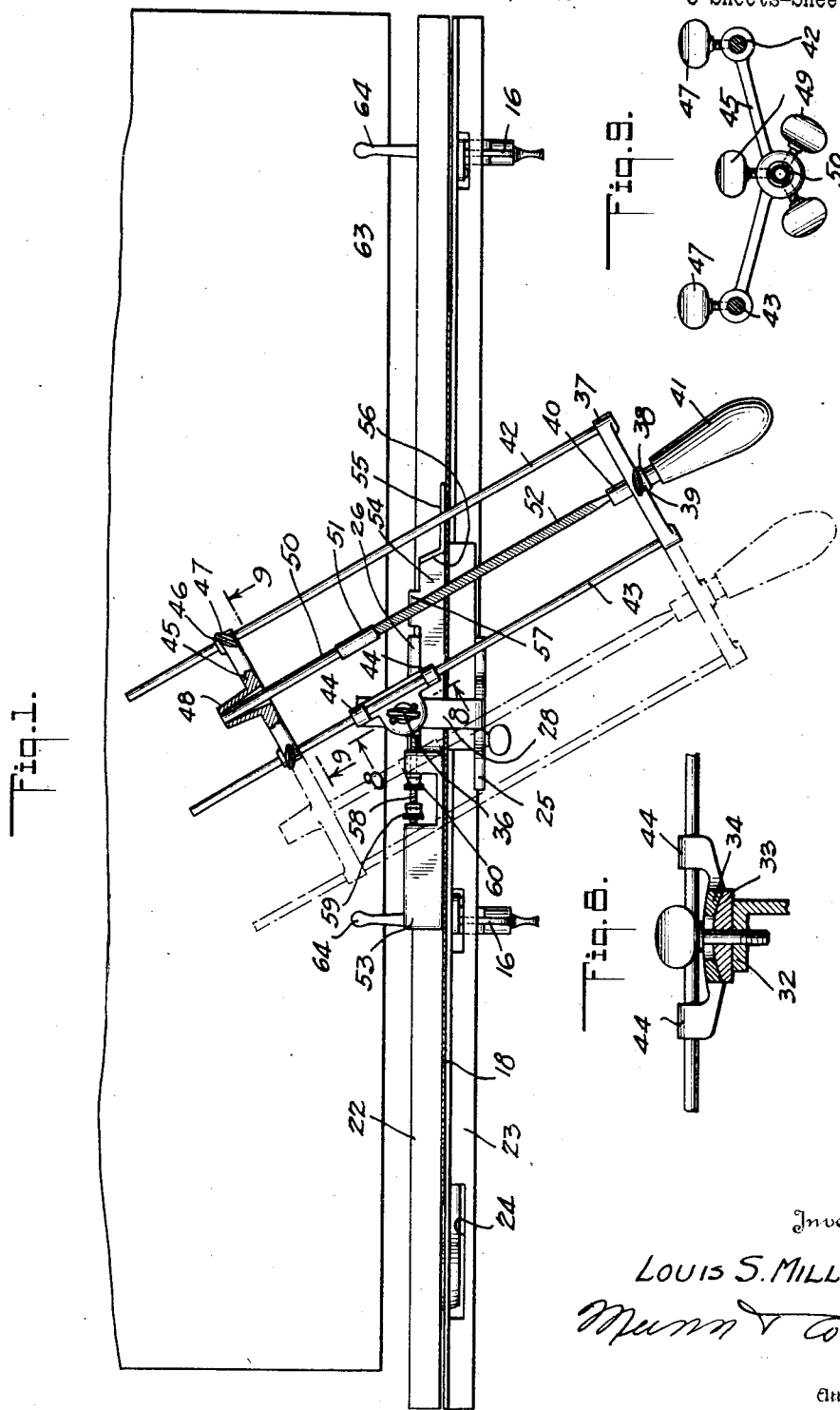

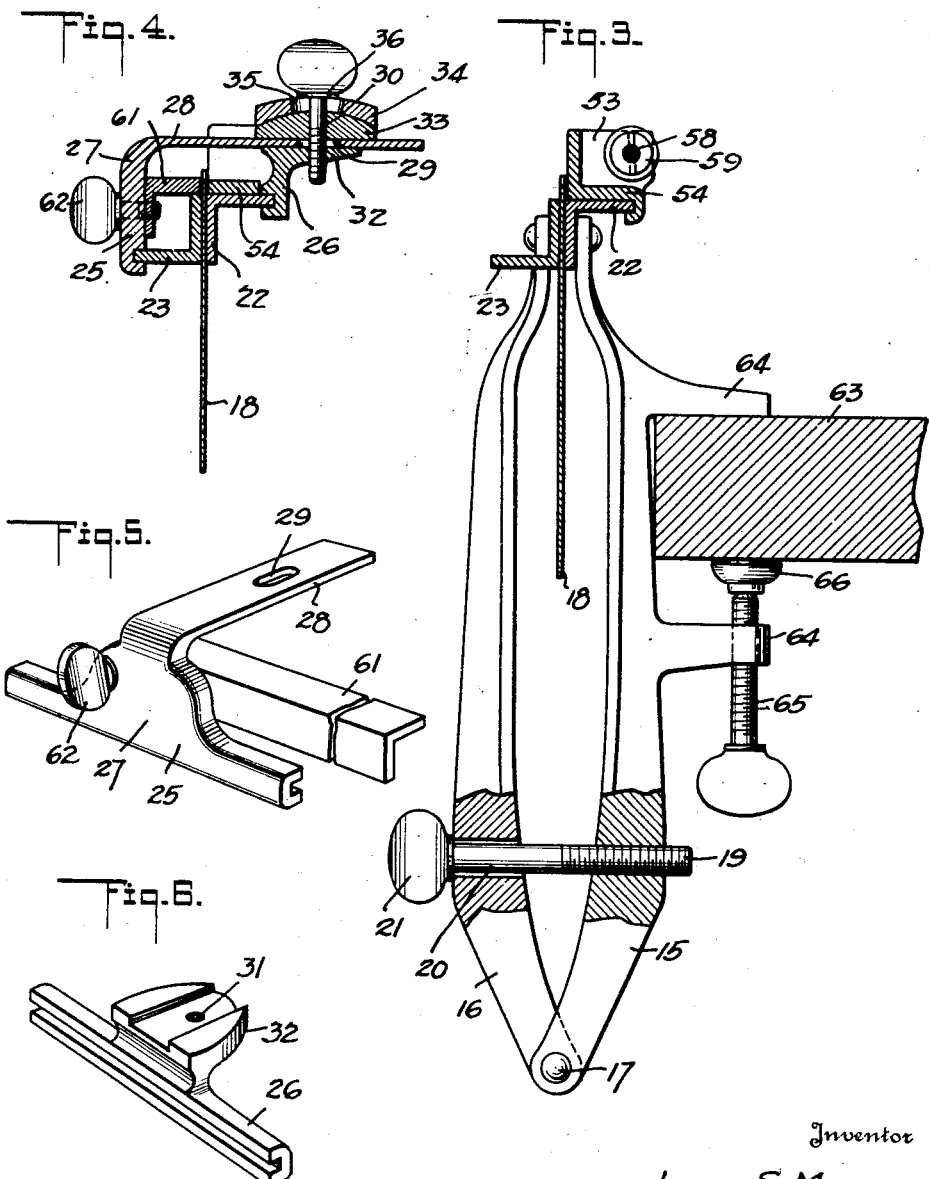

Patented Apr. 17, 1928.

1,666,395

UNITED STATES PATENT OFFICE.

LOUIS S. MILLER, OF LOS ANGELES, CALIFORNIA.

APPARATUS FOR SHARPENING HANDSAWS.

Application filed October 21, 1925. Serial No. 64,008.

My invention relates to saw sharpening apparatus, and the purpose of my invention is the provision of an extremely simple, durable and relatively inexpensive apparatus which is adjustable to accommodate and securely hold hand saws, and files of various lengths, and in such manner that a file can be manually reciprocated to sharpen the teeth of a saw and successively throughout the entire lenght of the saw, the file being mounted and operable to advance a predetermined distance after the filing of each tooth whereby the successive sharpening of the saw teeth can be effected with facility and dispatch.

I will describe only one form of saw sharpening apparatus embodying my invention and will then point out the novel features thereof in claims.

In the accompanying drawings,

Figure 1 is a view showing in top plan one form of saw sharpening apparatus embodying my invention with a saw in applied position thereon;

Figure 2 is a view showing in side elevation the apparatus shown in Figure 1;

Figure 3 is an enlarged vertical sectional view taken on line 3—3 of Figure 2;

Figure 4 is a similar view taken on line 4—4 of Figure 2;

Figure 5 is an enlarged detail perspective view of one of the members comprised in the file carriage of the apparatus shown in the preceding views and the adjacent angle bar of the saw holder;

Figure 6 is a detail perspective view of the other members of the file carriage.

Figure 7 is a detail perspective view of the file gage embodied in the apparatus shown in the preceding views;

Figures 8 and 9 are sectional views taken on the lines 8—8 and 9—9, respectively, of Figure 1.

Similar reference characters refer to similar parts in each of the several views.

My invention, in its present embodiment, comprises a saw holder of sufficient length to accommodate saws of various lengths and to hold the blade of the saw rigidly throughout its length, particularly along its cutting edge, in order that the sharpening operation of the teeth can be effectively performed. This holder, in the present instance, comprises a pair of spaced clamps, each clamp including a fixed arm 15 and a movable arm 16 pivoted at its lower end to the lower end of the stationary arm, as indicated at 17 (Figure 3), and the two arms being curved outwardly from their point of connection to a point adjacent their free ends where they are curved inwardly. The curvature of the arms is such as to accommodate a saw blade 18 therebetween. The arm 16 is capable of adjustment to have clamping engagement with the arm 15 through the medium of a screw bolt 19 threaded in the arm 15 and loosely rotatable in an opening 20 of the arm 16, with the outer end of the bolt provided with a shouldered head 21 to prevent the bolt passing through the arm 16.

Secured to the upper ends, respectively, of the arms 15 and 16 of the two clamps are angle bars 22 and 23 which constitute jaws for the clamps between which the saw blade 18 is arranged and securely clamped by proper adjustment of the screw bolts 19. As shown in Figure 3, these angle bars 22 and 23 are reversely arranged so that their vertical portions extend in opposite directions vertically, thus disposing their horizontal portions as illustrated. The angle bars are arranged in this manner in order that they may properly accommodate the other parts of the apparatus. It is to be noted that the horizontal portion of the angle bar 23 is provided with an opening 24 adjacent one end of the bar to accommodate that part of the saw handle necessary to permit elevation of the saw blade to a point where the tooth edge projects above the two angle bars.

Movable longitudinally on the jaws or bars 22 and 23 is a carriage comprising members 25 and 26 elongated and grooved on their confronting sides so as to receive and thus be slidably supported upon the angle bars 23 and 22, respectively. The member 25 is provided centrally with an upstanding head 27, and projecting at right angles from this head is a metallic strap 28 provided with a slot 29 in which extends a screw bolt 30 (Figure 4). The bolt 30 also extends through and is threaded in an opening 31 in a head 32 formed on the member 26, such head being slotted to accommodate the strap 28. A clamping head 33 reposes on the head 32, and a socket plate 34 reposes on the head 33 and is provided with a slot 35 through which the bolt 30 extends. The bolt is provided with a shouldered head 36 of sufficient diameter to prevent passage of the bolt through the slot 35 but at the same time permitting adjustment of the plate 34 on the bolt. The head and socket members 33 and 34, together with the bolt 30, constitute a universal connection between the carriage and a file holder to permit the necessary adjustment of the file holder to sharpen saw teeth of different angularities.

The file holder comprises a stationary frame 37 (Figure 1) having a socket 38 provided with a set screw 39 for releasably securing therein a socket member 40 provided with a handle 41. Extending from one side of the frame 37 is a pair of parallel rods 42 and 43, with the rod 43 slidably mounted in a pair of ears 44 formed on the socket plate 34, as clearly shown in Figure 8. A movable frame 45 is adjustably mounted on the rods 42 and 43 by the provision of sleeves 46 and set screws 47, the latter permitting locking of the frame in any position longitudinally of the rods. Medially of the frame 45 is a socket 48 having set screws 49 in which a rod 50 is secured. The inner end of the rod is provided with a socket member 51 and this member co-operates with the socket member 40 to receive the opposite ends of a file 52, and it will be understood that by adjustment of the socket members they can be employed to accommodate and securely hold files of different lengths. As shown in Figure 1, the socket member 48 is provided with a tapered bore which permits of a lateral adjustment of the rod 50, and it will be understood that through an adjustment of the set screws 49, the rod can be laterally adjusted to accurately position the socket member 51 so that the file 52 is supported and secured in true parallel relation to the rods 42 and 43.

By virtue of the fact that the rod 43 is slidably mounted in the ears 44, the entire file holder can be manually reciprocated to impart a corresponding movement to the file 52, and as the rod 43 is rotatable in the ears the holder can be swung upwardly from the filing position shown in solid lines in Figure 1 to the non-filing position shown in dash lines. Also the mounting permits slight elevation of the file 52 when moving the latter from tooth to tooth, as will be described more fully hereinafter.

Referring now to Figures 1 and 7, I have shown therein a gage by which the longitudinal movement of the carriage on the saw holder can be effected in a step by step manner and the file 52 simultaneously moved from one saw tooth to the desired tooth in advance throughout the entire length of the saw blade, such means being adjustable to vary the step by step movement to suit saw teeth of different sizes or spacing. This gage in the present instance comprises a rectangular body 53 provided at one end with a flat extension 54, and on the end of the extension a vertical member 55 is formed. At the inner end of the member 55 is a diagonal lip 56, and on the inner edge of the extension 54 is a down-turned lip 57 which, as shown in Figure 3, is constructed to provide a groove for slidably receiving the adjacent edge of the angle bar 22. The member 55, as shown in Figure 1, has sliding engagement with one side of the projecting portion of the saw blade, and thus operates in conjunction with the lip 57 to permit sliding movement of the gage as a unit on the angle bar 22. The lip 57, as shown in Figure 1, provides an abutment for the forward end of the member 26 of the carriage, and thus operates to limit the advance movement of the carriage when the gage is manually held against movement. In the operation of the gage, it is adapted to be advanced longitudinally along the saw holder, and such movement, in each instance, is determined by the adjustment of a threaded rod 58 projecting from the inner end of the body 53 and abutting the other end of the member 26. The advance movement of the gage can be varied by an adjustment of the rod 58, and to this end the rod is adjustable in the body 53 by threading the rod in the body and keying a nut 59 to the rod by which it may be rotated to feed the same forwardly or rearwardly and toward or away from the adjacent end of the member 26. The rod may be locked in any adjusted position by means of a nut 60, as will be understood.

By reference to Figures 4 and 5, it will be seen that the member 25 carries a relatively short angle bar 61 through the medium of a screw bolt 62, and in such manner that the inner edge portion of the bar reposes on the upper edge of the angle bar 23, so as to slide with the member 25. This bar 61 constitutes an element for limiting the depth of cut made in the teeth of the saw blade by the file 52 and at the same time protects the angle bars 22 and 23 against injury by the file. It also protects the flat extension 54 of the gage, as it will be noted in Figure 4 that the horizontal portion of the angle bar 61 is of greater thickness than the extension 54.

In the operation of the apparatus, the saw holder may be clamped to any suitable support, indicated at 63, by jaw extensions 64 formed on the stationary arms 15 of the saw clamps. The lower of the jaw extensions are provided with threaded openings to receive screw bolts 65 having clamping heads 66. It will be understood that by an adjustment of the bolts, the head 66 will co-operate with the upper jaw extension 64 to firmly secure the saw clamps in upright position on the support. With the saw blade firmly clamped between the angle bars 22 and 23 so that the teeth thereof project above the bars, the carriage is moved to the left hand end of the saw holder, as when viewed in Figure 1, to position the file 52 for engagement with the first tooth of the saw blade. By proper adjustment of the universal connection between the file holder and the carriage, both the horizontal and vertical positions of the file can be varied to suit the particular angularity of the tooth being sharpened, it being understood that the curvature of the head and socket elements 33 and 34 allows of a longitudinal adjustment of the file holder to vary the vertical plane in which the file moves, while the adjustment of the holder about the bolt 30 as a center permits a variance in the transverse angular position of the file with respect to the teeth of the saw blade.

With the file properly adjusted, it may now be reciprocated transversely of the saw blade by gripping the handle 41 and moving the holder forwardly and rearwardly, thereby causing the file to have filing engagement with one tooth of the saw. Following the sharpening of the first tooth, the file, by first elevating the holder to move the file out of engagement with the saw teeth, can be advanced the proper distance so that when again lowered it will engage the third tooth in advance for the subsequent sharpening thereof. This predetermined movement of the file is effected through the medium of the gage in the following manner: Before elevating the file out of engagement with the first tooth, the gage is advanced until the forward end of the rod 58 abuts the adjacent end of the member 26, when the adjacent end of the lip 57 will be disposed in spaced relation to the forward end of the member 26. Following the elevation of the file, the carriage is free to be advanced so that by pushing the latter to the right, it is moved until the forward end of the member 26 abuts the lip 57, and further movement of the carriage is thus prevented, it being understood that the gage is manually held against movement during this operation.

From the foregoing description, it will be understood that following the sharpening of all of the teeth, the file can be successively advanced in a step by step movement to engage and thus permit sharpening of all of the alternate teeth throughout the entire length of the saw blade. To sharpen the other teeth, it is, of course, necessary to change the adjustment of the file, but it is unnecessary to change the adjustment of the gage, it being understood that by starting with the second tooth of the saw blade the gage can be manipulated to advance the file from the second tooth to the fourth tooth and so on throughout the length of the saw blade.

Although I have herein shown and described only one form of apparatus for sharpening hand saws, it is to be understood that various changes and modifications may be made therein without departing from the spirit of the invention and the spirit and scope of the appended claims.

I claim as my invention:

1. In a saw sharpening apparatus, saw holding means, a carriage slidable thereon, means for limiting the depth of the cut of the sharpening apparatus, a file holder mounted for movement on the carriage, and a gage for limiting the movement of the carriage on the saw holding means, said gage having a member engageable with the carriage to limit its advancing movement, and a second member engageable with the carriage for limiting the advance movement of the carriage.

2. In a saw sharpening apparatus, saw holding means a carriage slidable thereon, means for limiting the depth of the cut of the sharpening apparatus, the last mentioned means comprising a horizontally disposed plate removably secured to the carriage and being slidable on the saw holding means, a file holder movably mounted on the carriage and a gage for limiting the movement of the carriage on the saw holding means, said gage having a first member engageable with the carriage to limit its advancing movement and a second member engageable with the carriage for limiting the advance movement of the latter.

3. In a saw sharpening apparatus, a saw holder comprising a plurality of clamps having jaws in the form of angle bars, the jaws being common to all the clamps and reversely arranged, a carriage slidable on the angle bars and a file holder mounted for reciprocating movement on the carriage and capable of universal adjustment thereon and an adjustable gage slidable on one of the angle bars for cooperation with the carriage to advance the file holder in a step by step movement, said gage being slidably secured to said angle bars, having a fixed member engaging the carriage to limit the advancement of the carriage and having adjustable means engaging the carriage to limit the advancement of the gage.

4. A saw sharpening apparatus comprising a saw holder including a plurality of spaced clamps and jaws in the form of angle bars between which a saw blade is adapted to be rigidly clamped throughout its length, the bars being arranged to provide vertical portions extending in opposite directions vertically and so as to dispose horizontal portions of the bars in different horizontal planes, a carriage comprising members having their confronting sides grooved to receive the edges of the horizontal portions of the angle bars so as to slidably support the carriage on the bars, one of said members having a lateral extension slidably associated with the other member, a clamping head on the other member, a socket member on the other member, means for securing the carriage member, clamping head and socket member together against relative movement, a file holder comprising adjustably connected frames slidably associated with the socket member and between which a file is adapted to be supported for engagement with the teeth of a saw in said jaws so that sharpening of the teeth of the saw will be effected upon reciprocation of the file holder, and a gage comprising a body slidably mounted on one of the angle bars and having a fixed stop engageable by the said first member of the carriage for limiting the advancing movement of the carriage and an adjustable stop engaging the member for limiting the advancing movement of the gage.

LOUIS S. MILLER.